United States Patent
Kuya (10) Patent No.: US 10,635,071 B2
(45) Date of Patent: Apr. 28, 2020

(54) SIMULATION DEVICE AND SIMULATION METHOD

(71) Applicant: Mitsubishi Electric Corporation, Tokyo (JP)

(72) Inventor: Ryo Kuya, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/334,025

(22) PCT Filed: Sep. 5, 2017

(86) PCT No.: PCT/JP2017/031901
§ 371 (c)(1),
(2) Date: Mar. 18, 2019

(87) PCT Pub. No.: WO2019/049195
PCT Pub. Date: Mar. 14, 2019

(65) Prior Publication Data
US 2019/0265668 A1  Aug. 29, 2019

(51) Int. Cl.
*G05B 19/05* (2006.01)
*G06F 9/455* (2018.01)

(52) U.S. Cl.
CPC ............. *G05B 19/05* (2013.01); *G06F 9/455* (2013.01); *G05B 2219/13186* (2013.01)

(58) Field of Classification Search
None
See application file for complete search history.

(56) References Cited

U.S. PATENT DOCUMENTS

| | | | |
|---|---|---|---|
| 7,974,828 B2 | 7/2011 | Okamura et al. | |
| 2008/0281575 A1* | 11/2008 | Okamura | G05B 19/056 703/21 |
| 2014/0040441 A1* | 2/2014 | Greifeneder | G05B 19/41885 709/220 |

(Continued)

FOREIGN PATENT DOCUMENTS

| | | |
|---|---|---|
| JP | 2001-209407 A | 8/2001 |
| JP | 2001-282328 A | 10/2001 |

(Continued)

OTHER PUBLICATIONS

International Search Report dated Nov. 28, 2017 for PCT/JP2017/031901 filed on Sep. 5, 2017, 3 pages without including English Translation.

(Continued)

*Primary Examiner* — Ryan A Jarrett
(74) *Attorney, Agent, or Firm* — Xsensus LLP (57) ABSTRACT

A simulation device includes a storage unit to store a PLC program for operating PLC systems, and a simulation unit to construct a virtual network system simulating a configuration of a network system that includes the PLC systems, and simulate an operation of the network system using the virtual network system and the PLC program. The network system includes the PLC systems, the virtual network system includes a plurality of virtual PLC systems to simulate an operation of the PLC systems, and the simulation unit causes the virtual PLC systems to execute the PLC program while synchronizing time in the virtual network system.

17 Claims, 7 Drawing Sheets

(56) References Cited

U.S. PATENT DOCUMENTS

| | | | |
|---|---|---|---|
| 2015/0242548 A1* | 8/2015 | Jones ................... | G05B 19/056 703/21 |
| 2016/0197778 A1* | 7/2016 | Jones ................... | G05B 19/056 709/222 |
| 2017/0114618 A1 | 4/2017 | Fladmark et al. | |

FOREIGN PATENT DOCUMENTS

| | | |
|---|---|---|
| JP | 2003-162304 A | 6/2003 |
| JP | 2008-293488 A | 12/2008 |
| JP | 2017-041201 A | 2/2017 |
| WO | 2015/190934 A1 | 12/2015 |

OTHER PUBLICATIONS

Decision to Grant received for Japanese Patent Application No. 2018-541453, dated Oct. 3, 2018, 4 pages including English translation.

* cited by examiner

| FIRST SET INFORMATION | | |
|---|---|---|
| NETWORK NUMBER | 101 | ... |
| STATION NUMBER | 601 | ... |
| SYSTEM NUMBER | 2 | ... |
| UNIT IDENTIFIER | 010 | ... |

FIG.7

| SECOND SET INFORMATION | | |
|---|---|---|
| NETWORK NUMBER | 101 | ... |
| STATION NUMBER | 601 | ... |
| BUFFER ADDRESS | 140 TO 159 | ... |

SIMULATION DEVICE AND SIMULATION METHOD

CROSS-REFERENCE TO RELATED APPLICATION

The present application is based on PCT filing PCT/JP2017/031901, filed Sep. 5, 2017, which is incorporated by reference.

FIELD

The present invention relates to a simulation device and a simulation method for performing a simulation of a network system that includes programmable logic controllers.

BACKGROUND

In the field of factory automation (FA) for automating factory production processes, automatic control equipment using programmable logic controllers (PLCs) is used. In this FA field, an FA system is constructed by disposing PLCs in the FA system. Thus, when a large-scale FA system is constructed, a plurality of PLCs are connected by a network.

When PLC systems are connected using a network, network units for connection to the network are used. There are various kinds of network units that are compatible with communication protocols or network configurations. Thus, a user can select and use network units appropriate for an FA system to be constructed.

When a PLC system is constructed, a simulation is performed to check the operation of a PLC program executed by a PLC. In the simulation, a virtual PLC to simulate the operation of an actual PLC is constructed on a computer, and it is checked whether the operation of the virtual PLC is a desired one. This enables correction of problems in the PLC program without constructing a PLC system itself, thus allowing a reduction in the cost of constructing an FA system.

In a simulation method described in Patent Literature 1, one personal computer (PC) operates one virtual PLC, and operations between virtual PLCs on a network are simulated and verified, using a PC network.

CITATION LIST

Patent Literature

Patent Literature 1: Japanese Patent Application Laid-open No. 2003-162304

SUMMARY

Technical Problem

Patent Literature 1, which is the above-described conventional technique, however, requires a PC for simulating the operation of a PLC for each PLC connected to a network. Therefore, to verify a large-scale PLC network, it is necessary to construct a complicated verification environment at high cost.

The present invention has been made in view of the above, and its object is to provide a simulation device capable of performing a simulation of a network system that includes programmable logic controllers with a simple configuration.

Solution to Problem

In order to solve the above-described problem and achieve the object, in an aspect of the present invention, a simulation device includes: a storage unit to store a PLC program for operating PLC systems; and a simulation unit to construct a virtual network system simulating a configuration of a network system that includes the PLC systems, and to simulate an operation of the network system using the virtual network system and the PLC program. In the simulation device in an aspect of the present invention, the network system includes the PLC systems, the virtual network system includes a plurality of virtual PLC systems to simulate an operation of the PLC systems. In the simulation device in an aspect of the present invention, the simulation unit causes the virtual PLC systems to execute the PLC program while synchronizing time in the virtual network system.

Advantageous Effects of Invention

The simulation device according to the present invention has an advantage in that a simulation of a network system that includes programmable logic controllers can be performed with a simple configuration.

DESCRIPTION OF EMBODIMENT

Hereinafter, a simulation device and a simulation method according to embodiments of the present invention will be described in detail with reference to the drawings. Note that the embodiments are not intended to the invention.

Embodiment

Figure 1:
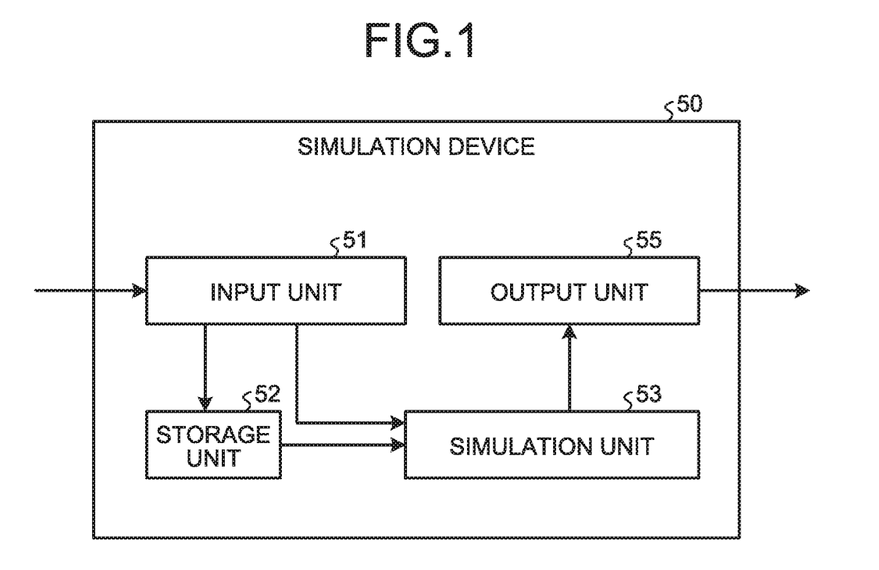
FIG. 1 is a diagram illustrating the configuration of a simulation device according to an embodiment of the present invention.

FIG. 1 is a diagram illustrating the configuration of a simulation device according to an embodiment of the present invention. A simulation device 50 is a computer that performs a simulation of a network system that includes a plurality of PLC systems. The simulation device 50 causes the virtual PLC systems disposed in a virtual network system to perform virtual operations that are simulations, thereby verifying the operation of an actual network system. An example of the network system is an FA system.

A PLC system includes a PLC that controls the whole of the PLC system, a power supply unit that supplies power to the PLC system; an input unit that accepts signals from a switch or a sensor attached to production equipment or facility equipment; an output unit that outputs control instructions to an external apparatus such as an actuator; a network unit that is a communication unit for connection to a network; and a base unit on which a plurality of units are mounted in the PLC system, the PLC, the power supply unit, the input unit, the output unit, and the network unit are connected to the base unit. The PLC is also called a PLC unit.

The PLC system is connected to another PLC system via the network unit. Specifically, the network unit of the PLC system is connected to the network unit of the other PLC system.

Each PLC system reads data from another PLC system via the network unit. Thus, the network system operates the PLC systems while performing data communication between the PLC systems.

In each PLC system, when the input unit or the network unit accepts data, the PLC generates a control instruction in response to the accepted data, and the output unit outputs the generated control instruction to the external apparatus. Thus, the PLC systems each control the external apparatus such as an actuator while transmitting and receiving data between the PLC systems.

In the embodiment, the simulation device 50 constructs therein a virtual network system, and causes the virtual network system to perform virtual operations. The virtual network system is a system simulating the configuration of a network system that includes PLC systems. The virtual network system includes a plurality of virtual PLC systems. Each virtual PLC system includes a virtual PLC and a virtual network unit NWU.

Figure 2:
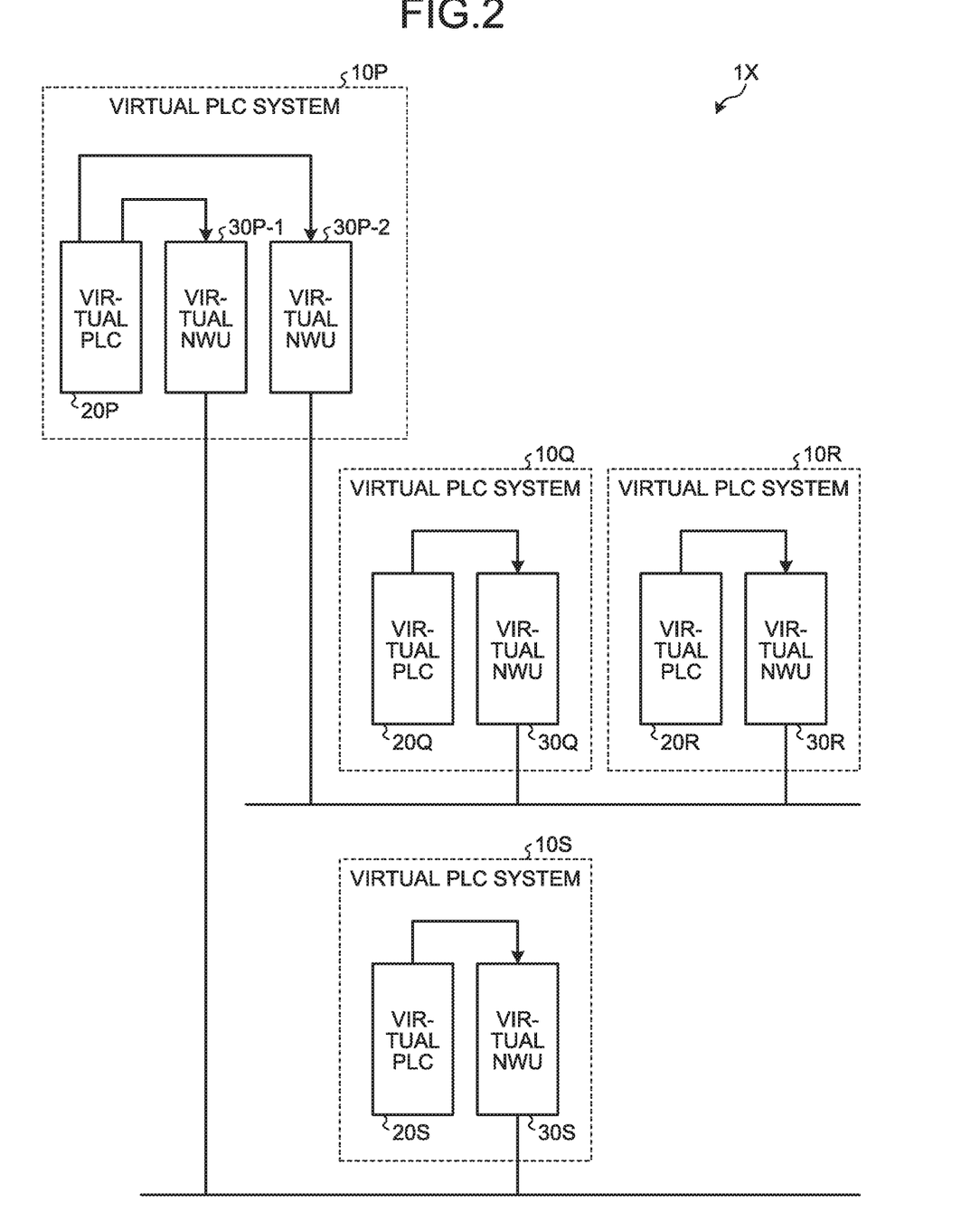
FIG. 2 is a diagram for describing the connection configuration of a virtual network system according to the embodiment.

FIG. 2 is a diagram for describing the connection configuration of a virtual network system according to the embodiment. Here, a case is described where virtual PLC systems disposed in a virtual network system 1X are four virtual PLC systems 10P, 10Q, 10R, and 10S. The virtual network system 1X is an example of a virtual network system 1 described later. Therefore, the virtual PLC systems 10P, 10Q, 10R, and 10S here have the same functions as virtual PLC systems 10A and 10B described later.

The virtual PLC system 10P includes a virtual PLC 20P, a virtual NWU 30P-1, and a virtual NWU 30P-2. The virtual PLC system. 10Q includes a virtual PLC 20Q and a virtual NWU 30Q. The virtual PLC system 10R includes a virtual PLC 20R and a virtual NWU 30R. The virtual PLC system 10S includes a virtual PLC 20S and a virtual NWU 30S.

The virtual NWU 30P-2 is connected to the virtual NWU 30Q of the virtual PLC system 10Q, which is different from the virtual PLC system 10P. The virtual NWU 30P-2 is also connected to the virtual NWU 30R of the virtual PLC system 10R, which is different from the virtual PLC systems 10P and 10Q. The virtual NWU 30P-1 is connected to the virtual NWU 303 of the virtual PLC system 10S, which is different from the virtual PLC systems 10P, 10Q, and 10R. Thus, in the virtual network system 1X, the virtual PLC system 10P includes a plurality of virtual NWUs, i.e., the virtual NWUs 30P-1 and 30P-2. The virtual NWU 30P-1 and the virtual NWU 30P-2 are connected to different virtual NWUs on different networks.

The simulation device 50 of the embodiment causes virtual PLC systems to perform virtual operations while performing time synchronization between the virtual PLC systems in a virtual network system, thereby verifying the operation of an actual network system. More specifically, the simulation device 50 performs time synchronization between the virtual PLC systems, data communication between the virtual PLC systems, and an operation using a PLC program in each virtual PLC system. Consequently, the simulation device 50 can check the behavior of the actual network system by simulation.

The simulation device 50 includes an input unit 51 that accepts various data to be used in performing a simulation from an external apparatus. The simulation device 50 further includes a storage unit 52 in which various data is stored. Examples of data stored in the storage unit 52 are PLC setting data, a simulation program, PLC programs, and configuration information.

The PLC programs are programs used when PLCs operate. The configuration information is information indicating the configuration of a network system, and is used in constructing a virtual network system. The configuration information includes information on constituent elements such as a list of constituent elements disposed in the network system, connection relationships between the constituent elements, and the functions of the constituent elements. The PLC setting data is data used when the PLCs operate. The PLC setting data includes various information such as operating conditions when the PLCs operate. The simulation program is a program for constructing, in the simulation device 50, virtual PLC systems for virtually operating the PLCs and performing a simulation of the PLCs using the virtual PLC systems. The simulation program constructs a virtual network system using the configuration information and performs a simulation using the constructed virtual network system, the PLC setting data, and the PLC programs.

The simulation device 50 further includes a simulation unit 53 that constructs a virtual network system and operates the virtual network system, thereby simulating the operation of the network system. The simulation unit 53 operates the virtual network system using the simulation program, the PLC setting data, and the PLC programs in other words, the simulation unit 53 performs a simulation of the network system, using the simulation program, the PLC setting data, and the PLC programs. The simulation device 50 further includes an output unit 55 that outputs simulation results to an external apparatus.

Thus, the simulation unit 53 operates a virtual network system using various data. The operation of the virtual network system is a virtual operation of the actual network system. Thus, the operations of the virtual PLC systems are virtual operations of the actual PLC systems.

Figure 3:
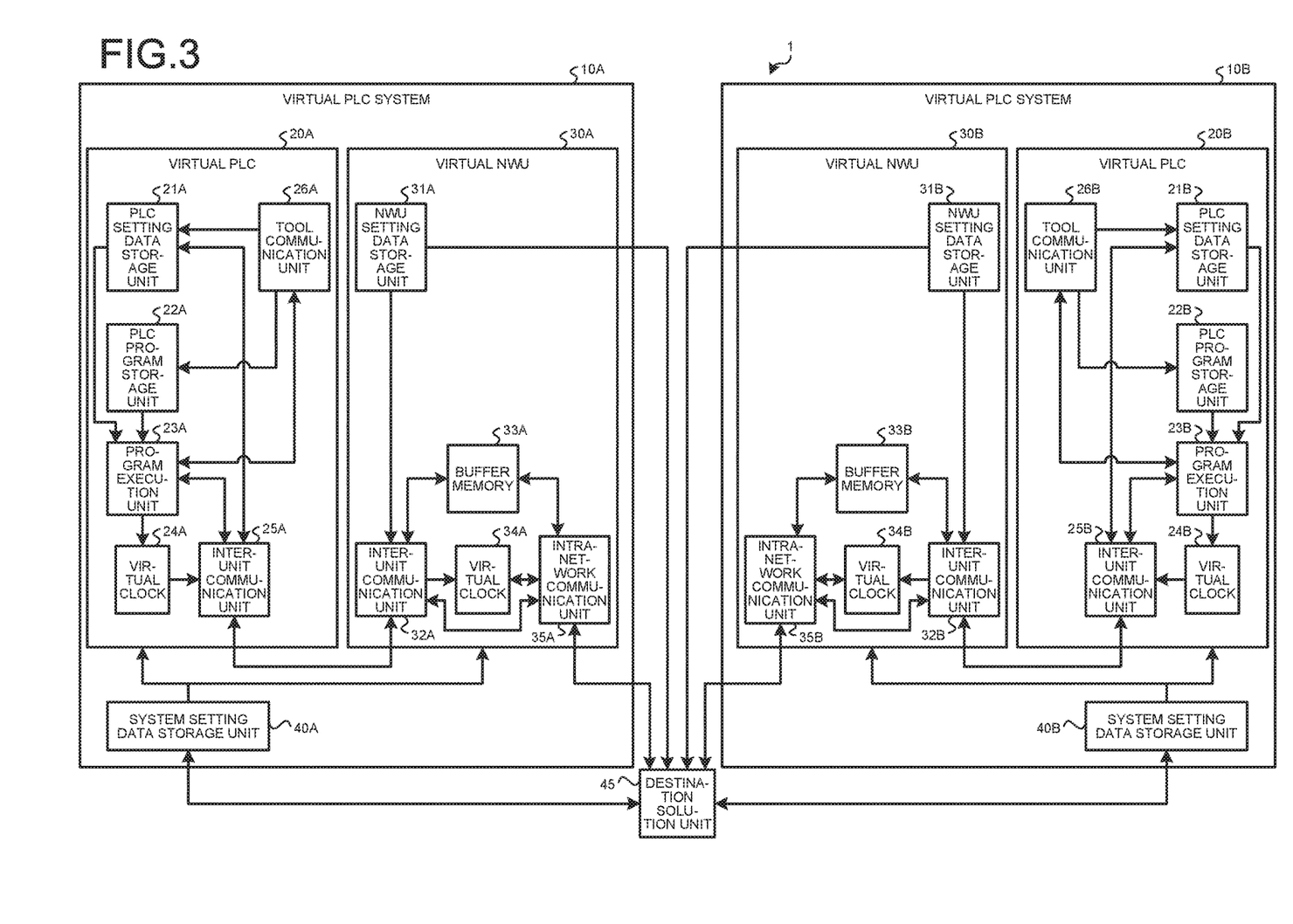
FIG. 3 is a diagram illustrating the configuration of the virtual network system according to the embodiment.

FIG. 3 is a diagram illustrating the configuration of the virtual network system according to the embodiment. FIG. 3 illustrates a functional block diagram of the virtual network system. 1 constructed by the simulation device 50. The following describes a case where virtual PLC systems disposed in the virtual network system 1 are two virtual PLC systems 10A and 10B. The number of virtual PLC systems disposed in the virtual network system 1 may be three or more. Operations in the virtual network system 1 are executed by the simulation unit 53. In other words, the simulation unit 53 performs a simulation using the virtual network system 1.

The virtual network system 1 is a system simulating an actual network system, and virtually executes the operation similar to the actual network system. The virtual network system 1 includes the virtual PLC systems 10A and 10B and a destination solution unit 45 connected to the virtual PLC systems 10A and 10B. The virtual PLC systems 10A and 10B are systems simulating actual PLC systems.

The simulation device 50 causes the virtual PLC system 10A, which is a first virtual PLC system, and the virtual PLC system 10B, which is a second virtual PLC system to perform virtual operations, while time synchronizing the virtual PLC systems 10A and 10B. Thus, the simulation device 50 verifies the operations of the actual PLC systems. Therefore, details of operations of the virtual PLC systems 10A and 10B caused by the simulation device 50 correspond to details of operations of the actual PLC systems.

Each actual PLC system operates using a PLC program. Therefore, the simulation device 50 causes the virtual PLC systems 10A and 10B to perform virtual operations, using PLC programs.

The virtual PLC system 10A performs an operation using a PLC program stored in the virtual PLC system 10A, and the virtual PLC system 10B performs an operation using a PLC program stored in the virtual PLC system 10B. At this time, the PLC program of the virtual PLC system 10A performs a further operation, using the results of the operation by the virtual PLC system 10B. Also, the PLC program of the virtual PLC system 10B performs a further operation, using the results of the operation by the virtual PLC system 10A.

The virtual PLC system 10A reads data from the virtual PLC system 10B on the basis of a station number described later, which is first identification information, a system number described later, which is second identification information, a unit identifier described later, which is third identification information, a network number described later, which is fourth identification information, and a buffer address described later. In this case, the virtual PLC system 10A performs data communication with the virtual PLC system 10B via the destination solution unit 45. When the virtual PLC system 10A is connected only to one network, the network number may be eliminated.

A specific configuration of the virtual PLC system 10A will be described. The virtual PLC system 10A includes a virtual PLC 20A; a virtual NWU 30A; and a system setting data storage unit 40A that stores system setting data. The virtual PLC 20A simulates the operation of a PLC, and the virtual NWU 30A simulates a network unit.

The virtual PLC system 10A is a group of units including the virtual PLC 20A and the virtual NWU 30A. Functions that can be performed by the virtual PLC system 10A are determined by the combination of the units.

The virtual PLC 20A is a unit that controls the virtual PLC system 10A. The virtual NWU 30A is a unit that communicates with the virtual PLC system 10B, which is another virtual PLC system. The virtual PLC 20A performs an operation corresponding to the actual PLC. The virtual NWU 30A performs an operation corresponding to the actual NWU.

The actual PLC system simulated by the virtual PLC system 10A includes a power supply unit, an input unit, or an output unit. Therefore, the virtual PLC system 10A includes a virtual power supply unit, a virtual input unit, or a virtual output unit. The actual network unit simulated by the virtual NWU 30A may be configured to be connectable to a unit other than the actual PLC. Thus, the virtual NWU 30A may be configured to be connectable to a virtual unit other than the virtual PLC 20A. A virtual unit in this case may be any unit that simulates the operation of a unit other than the actual PLC.

The system setting data storage unit 40A is a memory that stores system setting data. The system setting data an the system setting data storage unit 40A as information on the virtual PLC system 10A and is used in the virtual PLC systems 10A and 10B. Here, the configuration of the system setting data will be described.

Figure 4:
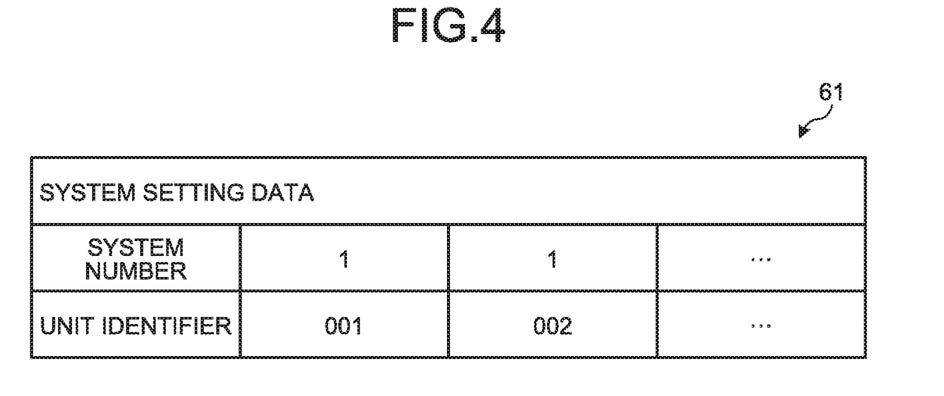
FIG. 4 is a diagram illustrating an example configuration of system setting data according to the embodiment.

FIG. 4 is a diagram illustrating an example configuration of the system setting data according to the embodiment. Here, system setting data 61 in the system setting data storage unit 40A will be described. The system setting data 61 includes unit identifiers of the units of the virtual PLC system 10A and a system number of the virtual PLC system 10A. In the system setting data 61, the unit identifiers are associated with the system number.

System numbers are identifiers given to the virtual PLC systems 10A and 10B in the virtual network system 1, and are pieces of information unique to the virtual PLC systems 10A and 10B. An example of the system number of the virtual PLC system 10A is "1", and an example of the system number of the virtual PLC system 10B is "2". The unit identifiers are pieces of information unique to the units in the virtual PLC system 10A.

The virtual PLC 20A includes a PLC setting data storage unit 21A, a PLC program storage unit 22A, a program execution unit 23A, a virtual clock 24A, an inter-unit communication unit 25A, and a tool communication unit 26A.

The system setting data 61 in a system setting data storage unit 40B has the same configuration as the system setting data 61 in the system setting data storage unit 40A. The system setting data 61 in the system setting data storage unit 40B includes information on a virtual PLC 20B and is used an the virtual PLC systems 10A and 10B.

The PLC setting data storage unit 21A is a memory that stores the above-described PLC setting data. The PLC setting data in the PLC setting data storage unit 21A is data set in an actual PLC corresponding to the virtual PLC 20A, and is created by a user.

An example of the PLC setting data is an inter-unit communication period that is a communication period between the virtual PLC 20A and the virtual NWU 30A, or a processing condition of the PLC program. An example of the processing condition of the PLC program is the period with which the PLC program is executed. In this case, the processing condition of the PLC program includes information specifying which program is executed with which period.

The PLC program storage unit 22A is a memory that stores the PLC program. The PLC program in the PLC program storage unit 22A is a program used to operate a PLC system corresponding to the virtual PLC system 10A. An example of the PLC program is a sequence program such as a ladder program.

The tool communication unit 26A performs data communication with an engineering tool not illustrated. The engineering tool is a tool for performing various settings to operate the virtual PLC system 10A. When the engineering tool performs various settings according to instructions from a user, setting information corresponding to the settings is transmitted to the virtual PLC system 10A. The tool communication unit 26A receives the setting information set by the engineering tool and transfers it to one of the PLC setting data storage unit 21A, the PLC program storage unit 22A, and the program execution unit 23A.

The tool communication unit 26A transfers setting information for the PLC setting data to the PLC setting data storage unit 21A, and transfers setting information for the PLC program to the PLC program storage unit 22A. The tool communication unit 26A transfers setting information for the execution processing of the PLC program to the program execution unit 23A. The tool communication unit 26A acquires data for which an acquisition request is made by the engineering tool from the program execution unit 23A and transfers it to the engineering tool.

The program execution unit 23A reads the PLC program from within the PLC program storage unit 22A and executes it. At this time, the program execution unit 23A executes the PLC program on the basis of the PLC setting data in the PLC setting data storage unit 21A. When setting information is transmitted from the tool communication unit 26A, the program execution unit 23A executes the PLC program using the setting information.

The program execution unit 23A advances the time of the virtual clock 24A according to the execution status of the PLC program. In other words, the program execution unit 23A advances virtual time that is time data in the virtual clock 24A in accordance with the progress of the PLC program. Upon starting the execution of the PLC program, the program execution unit 23A transmits a consumed time period corresponding to an executed instruction to the virtual clock 24A.

The virtual clock 24A is a virtual clock in which the time advances on the basis of the execution status of the PLC program by the program execution unit 23A. In the virtual clock 24A, the time at which the virtual PLC 20A has been reset is 0. When the execution of the PLC program is started, the virtual clock 24A accumulates a consumed time period determined for each instruction in the PLC program. Thus, the virtual clock 24A holds time data corresponding to executed instructions. Therefore, the time data in the virtual clock 24A represents a lapse of time from a reset time. The time data used in the embodiment is virtual time used to operate the virtual network system 1.

When the program execution unit 23A executes the PLC program, the inter-unit communication unit 25A performs data communication with another unit in the virtual PLC system 10A. The inter-unit communication unit 25A here performs data communication with the virtual NWU 30A.

The inter-unit communication unit 25A performs time synchronization with the virtual NWU 30A on the basis of the PLC setting data in the PLC setting data storage unit 21A and the time data read from the virtual clock 24A. Specifically, on the basis of the time data and the inter-unit communication period included in the PLC setting data, the inter-unit communication unit 25A detects an inter-unit communication timing described later, which is a timing at which to perform time synchronization with the virtual NWU 30A. Then, at the inter-unit communication timing, the inter-unit communication unit 25A performs time synchronization with the virtual NWU 30A. At this time, the inter-unit communication unit 25A transmits the time data in the virtual clock 24A to the virtual NWU 30A, and performs time synchronization by causing the virtual NWU 30A to set the time indicated by the time data.

In this way, the virtual PLC 20A periodically operates the inter-unit communication unit 25A, according to the time data and the inter-unit communication period, and performs time synchronization with the virtual NWU 30A that is another unit.

Note that time synchronization in the present embodiment is not limited to synchronization on the basis of literal time, e.g., hours, minutes, and seconds, and may be synchronization on the basis of the count value of a counter. It is only necessary that the virtual PLC 20A and the virtual NWU 30A can be synchronized with each other, and the virtual PLC 20B and a virtual NWU 30B can be synchronized with each other.

When there is a unit read request that is an instruction to read data in another unit or a unit write request that is an instruction to write data into another unit from the PLC program, the inter-unit communication unit 25A performs data communication with the virtual NWU 30A. Thus, the inter-unit communication unit 25A writes local-station data described later sent from the program execution unit 23A in the virtual NWU 30A. The inter-unit communication unit 25A transmits other-station data described later read from the virtual NWU 30A to the program execution unit 23A.

Thus, when executing the PLC program, the program execution unit 23A writes local-station data in another unit in the virtual PLC system 10A via the inter-unit communication unit 25A. Also, when executing the PLC program, the program execution unit 23A reads other-station data from another unit in the virtual PLC system 10A via the inter-unit communication unit 25A.

In this case, the inter-unit communication unit 25A performs data communication with the virtual NWU 30A on the basis of the system setting data 61 in the system setting data storage unit 40A. Specifically, the inter-unit communication unit 25A accesses a buffer memory 33A described later in the virtual NWU 30A on the basis of a pair of the system number and the unit identifier in the system setting data 61. Then, the inter-unit communication unit 25A writes local-station data in the buffer memory 33A, and reads other-station data from the buffer memory 33A. The inter-unit communication unit 25A transmits the read other-station data to the program execution unit 23A. Thus, the PLC program executes various processing using the other-station data.

The local-station data is data generated by the station itself, and the other station data is data generated by the other station. Therefore, the local-station data stored in the buffer memory 33A is data generated by the virtual PLC system 10A, and the other-station data stored in the buffer memory 33A is data generated by the virtual PLC system 10B. That is, local-station data stored in a buffer memory 33B is data on the virtual PLC system 10B, but it is other-station data when viewed from the virtual PLC system 10A.

The virtual NWU 30A is connected to the same network as the virtual NWU 30B. The virtual NWU 30A includes an NWU setting data storage unit 31A, an inter-unit communication unit 32A, the buffer memory 33A, a virtual clock 34A, and an intra-network communication unit 35A.

Figure 5:
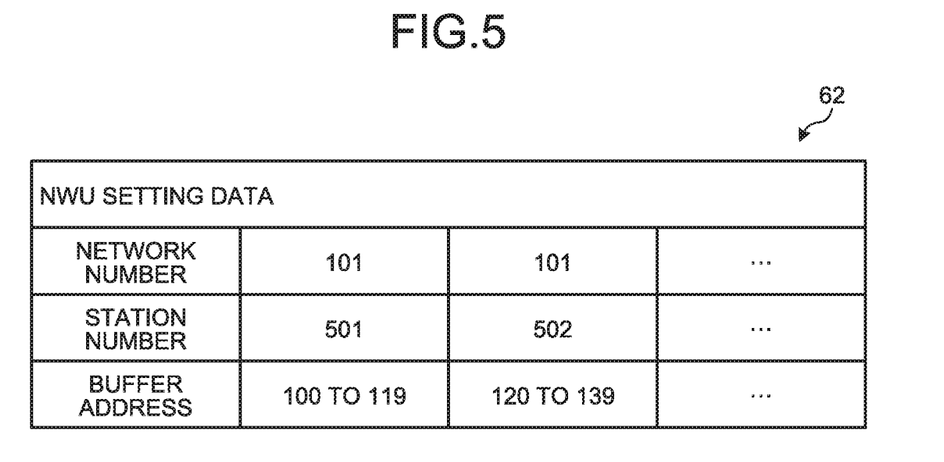
FIG. 5 is a diagram illustrating an example configuration of NWU setting data according to the embodiment.

The NWU setting data storage unit 31A is a memory that stores NWU setting data. Here, the configuration of the NWU setting data will be described. FIG. 5 is a diagram illustrating an example configuration of NWU setting data according to the embodiment. Here, NWU setting data 62 in the NWU setting data storage unit 31A will be described.

The NWU setting data 62 includes network numbers, station numbers, and buffer addresses. In the NWU setting data 62, the network numbers, the station numbers, and the buffer addresses are associated with one another. A network number here is an identifier assigned to the network to which the virtual NWUs 30A and 30B are connected. A network number is a number unique to each network in the virtual network system 1. The station numbers are identifiers of the virtual NWUs 30A and 30B in each network, and assigned to the respective virtual NWUs 30A and 30B connected to the network. The station numbers are pieces of information unique to the virtual NWUs 30A and 30B in one network. The buffer addresses are addresses indicating data storage areas in the buffer memory 33A. In the buffer memory 33A, a data storage area is allocated to each station number, and thus the buffer addresses and the station numbers are associated with each other by the NWU setting data 62.

The NWU setting data 62 further includes an inter-system communication period that is a communication period in the network. This inter-system communication period is used for time synchronization performed between the virtual NWUs 30A and 30B.

The NWU setting data 62 in an NWU setting data storage unit 31B has the same configuration as the NWU setting data 62 in the NWU setting data storage unit 31A. The NWU setting data 62 in the NWU setting data storage unit 31A includes information on the virtual NWU 30A, and the NWU setting data 62 in the NWU setting data storage unit 31B includes information on the virtual NWU 30B.

The inter-unit communication unit 32A performs data communication with the inter-unit communication unit 25A. The inter-unit communication unit 32A reads other-station data for which a read request is made by the inter-unit communication unit 25A from the buffer memory 33A and transmits it to the inter-unit communication unit 25A. The inter-unit communication unit 32A writes local-station data for which a write request is made by the inter-unit communication unit 25A in the buffer memory 33A.

The inter-unit communication unit 32A accesses the buffer memory 33A on the basis of the system setting data 61 in the system setting data storage unit 40A. Specifically, like the inter-unit communication unit 25A, the inter-unit communication unit 32A accesses the buffer memory 33A on the basis of the pair of the system number and the unit identifier in the system setting data 61. In this case, the inter-unit communication unit 32A accesses an area in the buffer memory 33A on the basis of the buffer addresses included in the NWU setting data 62.

When time data is sent from the inter-unit communication unit 25A, the inter-unit communication unit 32A sets the time data in the virtual clock 34A. Thus, the virtual clock 34A is synchronized with the virtual clock 24A every inter-unit communication period. In other words, the inter-unit communication units 25A and 32A adjust the time of the virtual clock 34A to the time of the virtual clock 21A.

When receiving a system read request that is an instruction to read data from another virtual PLC system from the inter-unit communication unit 25A, the inter-unit communication unit 32A transfers the system read request to the intra-network communication unit 35A.

The buffer memory 33A is a virtual storage unit that stores data generated in the virtual PLC 20A. The buffer memory 33A is configured to be accessible from the inter-unit communication unit 32A and the intra-network communication unit 35A. The buffer memory 33A stores local-station data written by the virtual PLC 20A and other-station data read from the virtual PLC system 10B.

The intra-network communication unit 35A performs time synchronization and data communication in the network to which the virtual NWU 30A is connected. The intra-network communication unit 35A here performs time synchronization and data communication with the virtual NWU 30B. The intra-network communication unit 35A performs time synchronization with the virtual NWU 30B on the basis of the inter-system communication period in the NWU setting data 62 and the time data in the virtual clock 34A. The intro-network communication unit 35A performs time synchronization with the virtual NWU 30B by adjusting the time of the virtual clock 34A to the time of a virtual clock 34B described later. The virtual NWUs 30A and 30B perform time synchronization by stopping, at a specific time, the virtual clock that is running ahead, and when the virtual clock that is running behind reaches the specific time, restarting the virtual clock that has been stopped.

When receiving a system read request from the virtual PLC 20A, the intra-network communication unit 35A reads other-station data corresponding to the system read request from the buffer memory 33B that is a memory in the virtual NWU 30B.

The destination solution unit 45 constructs first set information that is sets of network numbers, station numbers, system numbers, and unit identifiers. The destination solution unit 45 also constructs second set information that is sets of network numbers, buffer addresses in the buffer memory 33A, and station numbers.

On the basis of the system setting data 61 in the system setting data storage unit 40A and the NWU setting data 62 in the NWU setting data storage unit 31A, the destination solution unit 45 constructs the first set information and the second set information.

Figure 6:
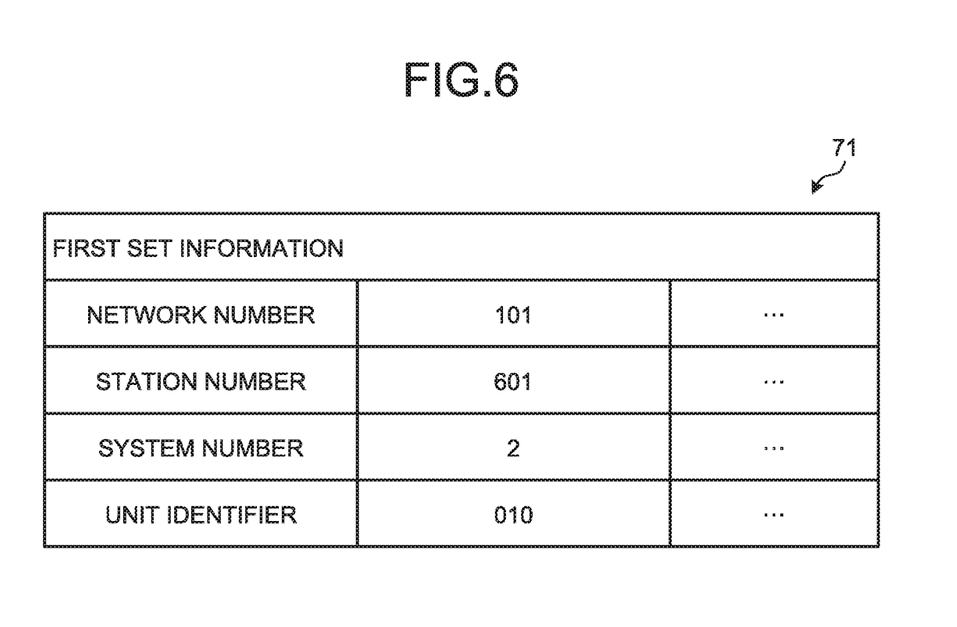
FIG. 6 is a diagram illustrating an example configuration of first set information according to the embodiment.

Here, the configurations of the first set information and the second set information wild be described. FIG. 6 is a diagram illustrating an example configuration of first set information according to the embodiment. First set information 71 is information in which network numbers, station numbers, system numbers, and unit identifiers are associated with one another.

The network number of a network of the first set information 71 is the network number of the network to which the virtual NWUs 30A and 30B are connected. The station numbers of the first set information 71 are the station numbers of the virtual NWUs 30A and 30B. The system numbers of the first set information 71 are the system numbers of the virtual PLC systems 10A and 10B. The unit identifiers of the first set information 71 are the unit identifiers of the units of the virtual PLC systems 10A and 10B.

FIG. 6 illustrates a case where the network number "101" of the network to which the virtual NWU 30B is connected, the station number "601" of the virtual NWU 30B, the system number "2" of the virtual PLC system 10B including the virtual NWU 30B, and the unit identifier "010" of the virtual NWU 30B are associated with one another.

Figure 7:
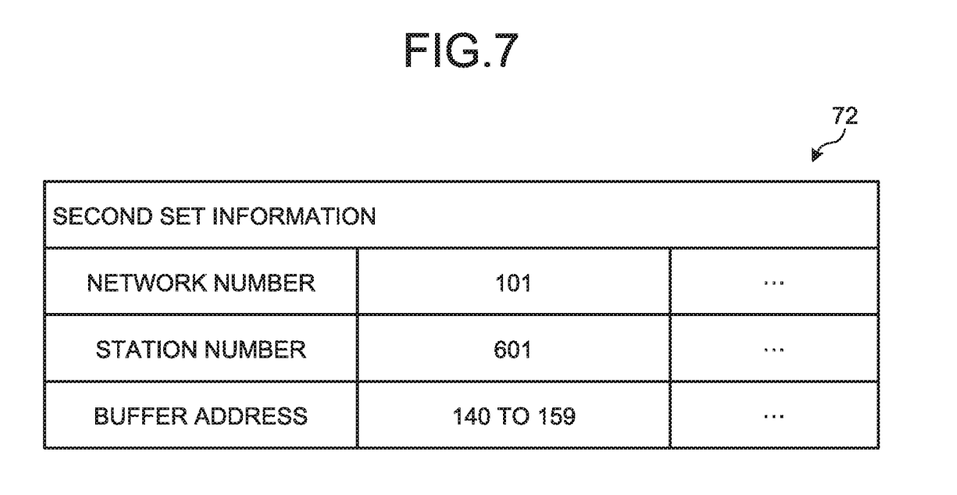
FIG. 7 is a diagram illustrating an example configuration of second set information according to the embodiment.

FIG. 7 is a diagram illustrating an example configuration of second set information according to the embodiment. Second set information 72 is information in which network numbers, buffer addresses, and station numbers are associated with one another. The network number of the second set information 72 is the network number of the network to which the virtual NWUs 30A and 30B are connected. The station numbers of the second set information 72 are the station numbers of the virtual NWUs 30A and 30B. The buffer addresses of the second set information 72 are the buffer addresses of the buffer memories 33A and 33B of the virtual NWUs 30A and 30B.

FIG. 7 illustrates a case where the network number "101" of the network to which the virtual NWU 30B is connected, the station number "601" of the virtual NWU 30B, and the buffer addresses "100 to 119" of the buffer memory 33B of the virtual NWU 30B are associated with one another.

The destination solution unit 45 constructs the first set information 71 on the basis of the system setting data 61 in the system setting data storage units 40A and 40B and the NWU setting data 62 in the NWU setting data storage units 31A and 31B. The destination solution unit 45 also constructs the second set information 72, on the basis of the NWU setting data 62 in the NWU setting data storage units 31A and 31B. In this case, the destination solution unit 45 extracts the network numbers, the station numbers, and the buffer addresses from the NWU setting data 62 stored in each of the NWU setting data storage units 31A and 31B. The destination solution unit 45 also extracts the system numbers and the unit identifiers from the system setting data 61 stored in each of the system setting data storage units 40A and 40B.

Then, the destination solution unit 45 constructs the first set information 71, using the extracted network numbers, station numbers, system numbers, and unit identifiers. Also, the destination solution unit 45 constructs the second set information 72, using the extracted network numbers, station numbers, and buffer addressees.

The virtual PLC system 10B has the same function as the virtual PLC system 10A. That is, the virtual PLC system 10B includes the virtual PLC 20B having the same function as the virtual PLC 20A, the virtual NWU 30B having the same function as the virtual NWU 30A, and the system setting data storage unit 40B having the same function as the system setting data storage unit 40A.

The virtual PLC 20B includes a PLC setting data storage unit 21B having the same function as the PLC setting data storage unit 21A, and a PLC program storage unit 22B having the same function as the PLC program storage unit 22A. The virtual PLC 20B further includes a program execution unit 23B having the same function as the program execution unit 23A, and a virtual clock 24B having the same function as the virtual clock 24A. The virtual PLC 20B further includes an inter-unit communication unit 25B having the same function as the inter-unit communication unit 25A, and a tool communication unit 26B having the same function as the tool communication unit 26A.

The virtual NWU 30B includes the NWU setting data storage unit 31B having the same function as the NWU setting data storage unit 31A, and an inter-unit communication unit 32B having the same function as the inter-unit communication unit 32A. The virtual NWU 30B further includes the buffer memory 33B having the same function as the buffer memory 33A, the virtual clock 34B having the same function as the virtual clock 34A, and an intra-network communication unit 35B having the same function as the intra-network communication unit 35A. The virtual PLC system 10B executes the same operation as the virtual PLC system 10A.

In the embodiment, the simulation device 50 constructs the virtual network system 1 including the virtual PLC systems 10A and 10B the simulation device 50 that is a computer. Then, the simulation device 50 operates the virtual PLC systems 10A and 10B, thereby simulating time synchronization and data exchange between the virtual NWUs 30A and 30B. Thus, the simulation device 50 causes the virtual PLC systems 10A and 10B to operate in synchronization with each other.

Figure 8:
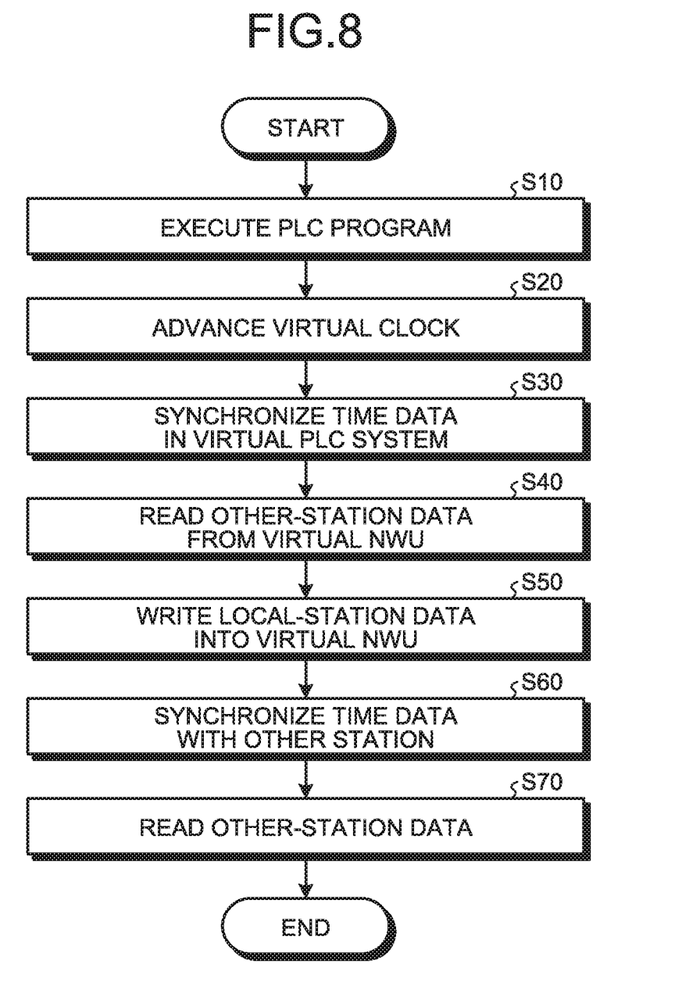
FIG. 8 is a flowchart illustrating an operation procedure performed by the virtual network system according to the embodiment.

FIG. 8 is a flowchart illustrating an operation procedure performed by the virtual network system according to the embodiment. In the virtual network system 1, the virtual PLC system 10A acquires data from the virtual PLC system 10B to operate, and the virtual PLC system 10B acquires data from the virtual PLC system 10A to operate. In this case, the virtual PLC systems 10A and 10B execute synchronization processing on the basis of the virtual clocks 34A and 34B. Since the virtual PLC systems 10A and 10B execute the same operation, the following describes a case where the virtual PLC system 10A acquires data from the virtual PLC system 10B to operate. That is, a case where an example of a local station is the virtual PLC system 10A and an example of the other station is the virtual PLC system 10B is described.

The virtual PLC system 10A of the virtual network system 1 constructed by the simulation device 50 executes the PLC program in accordance with an instruction from the simulation device 50 in step S10. More specifically, the program execution unit 23A reads the PLC program from the PLC program storage unit 22A and executes the PLC program. At this time, the program execution unit 23A executes the PLC program using the PLC setting data acquired from the PLC setting data storage unit 21A and the setting information acquired from the tool communication unit 26A if there is local-station data that is generated during the execution of the PLC program and is to be transmitted to the virtual PLC system 10B, the program execution unit 23A transmits the local-station data to the inter-unit communication unit 25A. The local-station data is data generated by the virtual PLC system 10A that is defined as a local station.

In step S20, the program execution unit 23A advances the virtual clock 24A on the basis of the progress status of the PLC program. The inter-unit communication unit 25A operates according to the time data held by the virtual clock 24A and the inter-unit communication period set in the PLC setting data. The inter-unit communication unit 32A operates according to the time data held by the virtual clock 34A.

On the basis of the time data in the virtual clock 24A and the inter-unit communication period, the inter-unit communication unit 25A detects an inter-unit communication timing set between the virtual PLC 20A and the virtual NWU 30A. Upon detecting the inter-unit communication timing, the inter-unit communication unit 25A performs time synchronization with the virtual NWU 30A.

At the inter-unit communication timing, the inter-unit communication unit 25A transmits the time data to the inter-unit communication unit 32A. Upon receiving the time data from the inter-unit communication unit 25A, the inter-unit communication unit 32A sets the time data in the virtual clock 34A. That is, at the inter-unit communication timing, the virtual PLC 20A sets the time data in the virtual PLC 20A in the virtual NWU 30A. Thus, in step S30, the virtual PLC system 10A synchronizes the time data in the virtual PLC system 10A.

The inter-unit communication unit 25A performs data communication with the virtual NWU 30A in accordance with an instruction from the PLC program. When receiving a data read request from the PLC program, in step S40, the inter-unit communication unit 25A reads other-station data from the buffer memory 33A of the virtual NWU 30A. At this time, the inter-unit communication unit 25A reads the other-station data from the buffer memory 33A via the inter-unit communication unit 32A. When receiving a data write request from the PLC program, in step S50, the inter-unit communication unit 25A writes local-station data into the virtual NWU 30A. At this time, the inter-unit communication unit 25A writes the local-station data in the buffer memory 33A via the inter-unit communication unit 32A.

Figure 9:
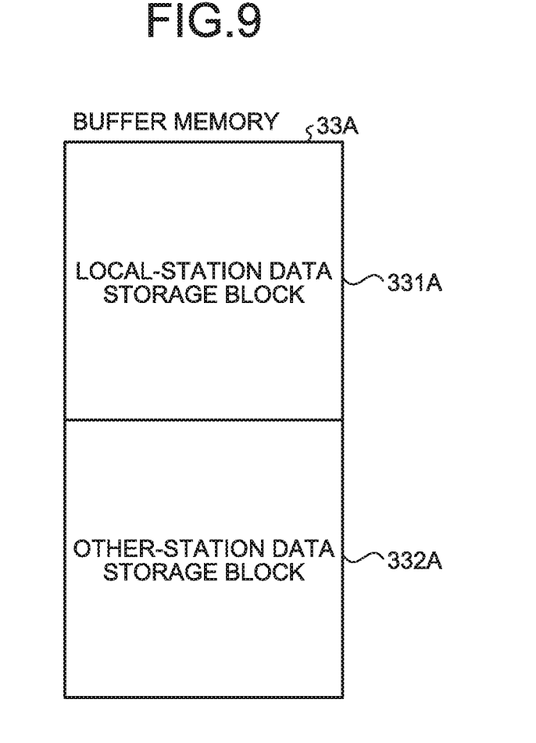
FIG. 9 is a diagram illustrating an example configuration of a buffer memory according to the embodiment.

Here, the configuration of the buffer memory 33A will be described. FIG. 9 is a diagram illustrating an example configuration of the buffer memory according to the embodiment. Here, the configuration of the buffer memory 33A is described. The buffer memory 33B has the same configuration as the buffer memory 33A.

The data storage area of the buffer memory 33A is divided into a local-station data storage block 331A for storing local-station data and an other-station data storage block 332A for storing other-station data. The local-station data storage block 331A is an area for storing data on the virtual PLC system 10A, which is local-station data, and the other-station data storage block 332A is an area for storing data on the virtual PLC system 10B, which is other-station data. The local-station data storage block 331A and the other-station data storage block 332A each have unique buffer addresses in the buffer memory 33A. The buffer addresses are included in the NWU setting data 62.

In the buffer memories 33A and 33B, the virtual PLC systems 10A and 10B use common buffer addresses. Also, in the buffer memories 33A and 33B, the virtual PLC systems 10A and 10B store the same data at each buffer address. Therefore, data stored at the first buffer address in the buffer memory 33A and data stored at the first buffer address in the buffer memory 33B are the same data. In other words, the same data is stored in a data storage area to which the first buffer address is assigned in the buffer memory 33A and in a data storage area to which the first buffer address is assigned in the buffer memory 33B. When data on the virtual NWU 30A is stored in a data storage area at buffer addresses 100 to 119 in the buffer memory 33A, the data on the virtual NWU 30A is also stored in a data storage area at buffer addresses 100 to 119 an the buffer memory 33B. In other words, when a station number "X" is assigned to the buffer addresses 100 to 119 of the buffer memory 33A, the station number "X" is also assigned to the buffer addresses 100 to 119 of the buffer memory 33B.

The buffer memories 33A and 33B are managed by a buffer memory identifier composed of the pair of the system number and the unit identifier, and are used in the form of shared memories of the virtual PLC systems 10A and 10B. This configuration allows any constituent element in the virtual network system 1 to access the buffer memory 33A and 33B, using the buffer memory identifier in the virtual network system 1.

As described above, the system setting data 61 includes the unit identifier of each unit of the virtual PLC system 10A and the system number of the virtual PLC system 10A. Thus, the inter-unit communication unit 25A of the virtual PLC system 10A and the inter-unit communication unit 32A of the virtual NWU 30A are each assigned with a unique identifier in the virtual PLC system 10A. Specifically, the inter-unit communication units 25A and 32A are each assigned with a buffer memory identifier composed of a pair of the unit identifier and the system number. Thus, the inter-unit communication unit 25A and the buffer memory 33A can each be specified by the buffer memory identifier composed of the pair of the system number and the unit identifier.

In the virtual PLC system 10A, the virtual PLC 20A performs two types of communication processing with the virtual NWU 30A, which are write processing and read processing in the write processing, the virtual PLC 20A can specify a write target by a pair of a buffer memory identifier and a buffer address. In read processing, the virtual PLC 20A can specify a read target by a pair of a buffer memory identifier and a buffer address.

The intra-network communication unit 35A performs time synchronization with the virtual NWU 30B when the time data reaches a communication timing set in the network, on the basis of the time data in the virtual clock 34A and the inter-system communication period. In the following description, a communication timing set in the network is referred to as an inter-system communication timing. Since the virtual PLC systems 10A and 10B are disposed in the network here, an inter-system communication timing here can also be referred to as a communication timing set between the virtual PLC systems 10A and 10B.

A difference may occur between the time data used by the virtual PLC system 10A and the time data used by the virtual PLC system 10B. Therefore, the intra-network communication units 35A and 35B perform time synchronization on the basis of the time data in the intra-network communication unit 35A and the time data in the intra-network communication unit 35B.

When the time of the virtual PLC system 10A is ahead of the time of the virtual PLC system 10B and the intra-network communication unit 35A detects an inter-system communication timing, the intra-network communication unit 35A notifies the intra-network communication unit 35B of timing information indicating that the inter-system communication timing has come. Then, the virtual PLC 20A stops the execution of the PLC program.

When the intra-network communication unit 35B that has received the timing information from the intra-network communication unit 35A detects the inter-system communication timing at the station to which it belongs, it sends synchronization confirmation information indicating confirmation of time synchronization to the intra-network communication unit 35A. Consequently, the virtual PLC 20A resumes the execution of the PLC program and continues the execution of the PLC program until the next inter-system communication timing.

When the time of the virtual PLC system 10B is ahead of the time of the virtual PLC system 10A and the intra-network communication unit 35B detects an inter-system communication timing, the intra-network communication unit 35B notifies the intra-network communication unit 35A of timing information indicating that the inter-system communication timing has come. Then, the virtual PLC 20B stops the execution the PLC program.

When the intra-network communication unit 35A that has received the timing information from the intra-network communication unit 35B detects the inter-system communication timing at the station to which it belongs, it sends synchronization confirmation information indicating confirmation of time synchronization to the intra-network communication unit 35B. Consequently, the virtual PLC 20B resumes the execution of the PLC program and continues the execution of the PLC program until the next inter-system communication timing.

Thus, the virtual PLC systems 10A and 10B each synchronize the time data with the other station in step S60. In other words, the virtual PLC systems 10A and 10B compare and adjust the time data. When three or more virtual NWUs are connected on a network, the virtual NWU that is the last to detect an inter-system communication timing at the station to which it belongs transmits synchronization confirmation information to the other stations.

As described above, the virtual PLC 20A performs time synchronization with the virtual NWU 30A at an inter-unit communication timing. Likewise, the virtual PLC 20B performs time synchronization with the virtual NWU 30B at an inter-unit communication timing. Also, the virtual NWU 30A performs time synchronization with the virtual NWU 30B at an inter-system communication timing.

When there is a data acquisition request from the virtual PLC 20A, the intra-network communication unit 35A performs data communication with the virtual PLC system 10B. Consequently, in step S70, the intra-network communication unit 35A reads other-station data from the buffer memory 33B. At this time, the intra-network communication unit 35A reads the other-station data from the buffer memory 33B via the intra-network communication unit 35B. Then, the intra-network communication unit 35A stores the read other-station data in the buffer memory 33A. In this case, the intra-network communication unit 35A reads the other-station data from the virtual PLC 20B on the basis of the NWU setting data 62 stored in the NWU setting data storage unit 31A. Other-station data here is data generated by another station such as the virtual PLC system 10B.

In this way, the virtual PLC 20A executes the PLC program while performing time synchronization and data communication with the virtual NWU 30A. The virtual PLC 20B executes the PLC program while performing time synchronization and data communication with the virtual NWU 30B. The virtual PLC system 10A operates while performing time synchronization and data communication with the virtual PLC system 10B. At this time, time synchronization is performed between the virtual NWUs 30A and 30B.

That is, the simulation unit 53 causes first time synchronization, which is time synchronization between the virtual clocks 24A and 34A, to be performed in the virtual PLC system 10A, which is the first virtual PLC system. The simulation unit 53 causes second time synchronization, which is time synchronization between the virtual clocks 24B and 34B, to be performed in the virtual PLC system 10B, which is the second virtual PLC system. Then, the simulation unit 53 performs time synchronization by synchronizing a first time set by the first time synchronization and a second time set by the second time synchronization.

Here, a method of reading other-station data will be described. Here, read processing when the intra-network communication unit 35A of the virtual PLC system 10A reads other-station data from the buffer memory 33B of the virtual PLC system 10B will be described. The other-station data stored in the buffer memory 33B is other-station data when viewed from the virtual PLC system 10A, and it is local-station data when viewed from the virtual PLC system 10B.

As described above, the destination solution unit 45 constructs the first set information 71, which is the sets of the network numbers, the station numbers, the system numbers, and the unit identifiers. The destination solution unit 45 also constructs the second set information 72, which is the sets of the network numbers, the buffer addresses in the buffer memory 33A, and the station numbers.

When the virtual PLC 20A transmits a read request for other-station data to the intra-network communication unit 35A, the intra-network communication unit 35A extracts a buffer address included in the read request. The buffer address is an address of an area in which an object to be read is stored, which is common to the buffer memories 33A and 33B.

The intra-network communication unit 35A sends the extracted buffer address to the destination solution unit 45. The destination solution unit 45 reads the NWU setting data 62 from the NWU setting data storage unit 31A. Then, the destination solution unit 45 extracts a network number from the NWU setting data 62. The network number is the network number of the network to which the virtual PLCs 20A and 20B are connected.

The destination solution unit 45 reads the other-station data to be read from the buffer memory 33B, on the basis of the network number and the buffer address. More specifically, the destination solution unit 45 extracts a station number from the second set information 72, on the basis of the pair of the network number and the buffer address. Thus, the destination solution unit 45 converts the pair of the network number and the buffer address into a pair of the network number and the station number.

Further, the destination solution unit 45 extracts a system number and a unit identifier from the first set information 71, on the basis of the pair of the network number and the station number. Thus, the destination solution unit 45 converts the pair of the network number and the station number into the pair of the system number and the unit identifier. In this manner, the destination solution unit 45 converts the pair of the network number and the buffer address into the pair of the system number and the unit identifier using the first set information 71 and the second set information 72.

Then, the destination solution unit 45 identifies the buffer memory 33B on the basis of the pair of the system number and the unit identifier. Thereafter, the destination solution unit 45 accesses the buffer address of the identified buffer memory 33B, and reads the other-station data to be read. Then, the destination solution unit 45 transmits the read other-station data to the intra-network communication unit 35A. Consequently, the intra-network communication unit 35A stores the other-station data in the buffer memory 33A. At this time, the intra-network communication unit 35A stores the other-station data in the buffer address included in the read request.

Figure 10:
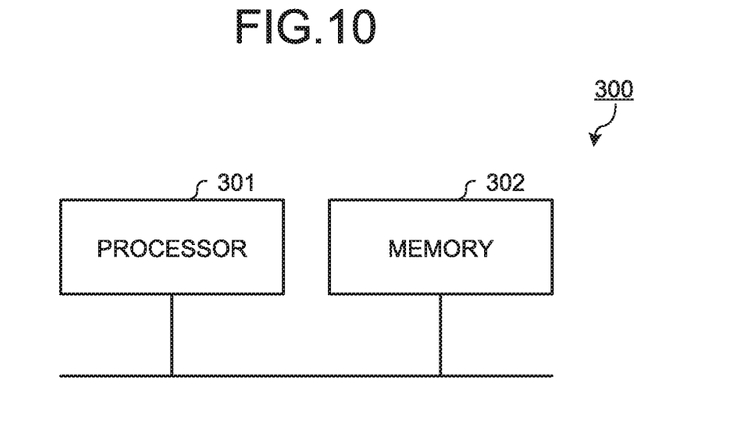
FIG. 10 is a diagram illustrating an example of a hardware configuration of the simulation device according to the embodiment.

Here, the hardware configuration of the simulation device 50 will be described. FIG. 10 is a diagram illustrating an example of a hardware configuration of the simulation device according to the embodiment. The simulation device 50 can be implemented by a control circuit 300 illustrated in FIG. 10, that is, a processor 301 and a memory 302. Examples of the processor 301 are a central processing unit (CPU, also called a central processor, a processing unit, an arithmetic unit, a microprocessor, a microcomputer, a processor, and a DSP) and system large-scale integration (LSI). Examples of the memory 302 are a random access memory (RAM) and a read-only memory (ROM).

The simulation device 50 is implemented by the processor 301 reading and executing a simulation program stored in the memory 302 for executing the operation of the simulation device 50. In other words, the simulation program causes a computer to execute the procedure or method of the simulation device 50. The memory 302 is also used as a temporary memory when the processor 301 executes various processing.

Thus, the simulation program executed by the processor 301 is a computer program product including a non-transitory computer-readable recording medium including a plurality of instructions for performing data processing, which can be executed by a computer. The simulation program executed by the processor 301 causes a computer to perform data processing by a plurality of instructions. Note that the functions of the simulation device 50 may be implemented partly by dedicated hardware and partly by software or firmware.

There is a method in which, when the system executes operation of itself by using the results of operation by the virtual PLC system 10B, as in the case with the virtual PLC system 10A, a simulation is performed after a data area storing possible operation results is prepared. In this method, a simulation is performed while changing a data area to be used. However, this method requires modification of PLC programs to be simulated such that a plurality of data areas are referred to, which increases the cost for simulation. In contrast, in the simulation method of the embodiment by the simulation device 50, it is not necessary to modify PLC programs; therefore, a verification environment using a simulation can be achieved at low cost. In other words, since the simulation device 50 of the embodiment does not need to modify PLC programs, a verification environment using a simulation can be achieved with a simple configuration.

Thus, the simulation device 50 constructs the virtual network system 1 and causes the virtual PLC systems 10A and 10B to execute the PLC programs while synchronizing time in the virtual network system 1. Consequently, the simulation device 50 can operate the virtual network system 1, and thus can simulate the operations of the actual network system without actually constructing the network system. Therefore, the simulation device 50 can check operations at a lower cost than when it actually constructs a network system and checks the operations of PLC programs.

Note that a user can select and use network units suitable for a network system to be constructed. Network units in this case may be those capable of setting network configuration individually by parameters. Further, by using a plurality of network units in a single PLC system, the PLC system may be connected to a plurality of networks of different settings. Regardless of what configuration a network system determined by a user has, the simulation device 50 can construct a virtual network system like the virtual network system. 1 and perform a simulation.

In this way, in the embodiment, the simulation unit 53 of the simulation device 50 constructs the virtual network system 1, and the virtual network system 1 causes the virtual PLCs 20A and 20B to execute the PLC programs while synchronizing time in the virtual network system 1. Thus, the virtual PLC 20A can execute the PLC program by using data generated by the virtual PLC 20B. Therefore, a simulation of a network system that includes PLC systems can be performed with a simple configuration.

The virtual PLC 20A performs time synchronization with the virtual NWU 30A, and the virtual PLC 20B performs time synchronization with the virtual NWU 30B. Then, the virtual network system 1 performs time synchronization between the virtual NWUs 30A and 30B. This allows time synchronization to be accurately performed in the virtual network system 1.

The virtual PLC system 10A reads data from the virtual PLC system 10B, on the basis of a station number, a system number, a unit identifier, a network number, and a buffer address; therefore, the virtual PLC system 10A can easily read data from the virtual PLC system 10B.

The simulation unit 53 constructs the virtual network system 1 using the configuration information; therefore, the simulation unit 53 can easily construct the virtual network system 1.

The virtual PLC 20A advances the time of the virtual clock 24A according to the execution status of the PLC program; therefore, the virtual network system 1 can perform accurate time synchronization.

The configurations described in the above embodiment illustrate examples of an aspect of the present invention, and can be combined with another known art or can be partly omitted or changed without departing from the scope of the present invention.

REFERENCE SIGNS LIST

1 virtual network system; 10A, 10B virtual PLC system; 20A, 20B virtual PLC; 21A, 21B PLC setting data storage unit; 22A, 22B PLC program storage unit; 23A, 23B program execution unit; 24A, 24B, 34A, 34B virtual clock; 25A, 25B, 32A, 32B inter-unit communication unit; 26A, 26B tool communication unit; 30A, 30B virtual NWU; 31A, 31B NWU setting data storage unit; 33A, 33B buffer memory; 35A, 35B intra-network communication unit; 40A, 40B system setting data storage unit; 45 destination solution unit; simulation device; 53 simulation unit; 61 system setting data; 62 NWU setting data; 71 first set information; 72 second set information.

The invention claimed is:

1. A simulation device comprising:
    a memory to store a first PLC program for operating a first PLC system and a second PLC program for operating a second PLC system; and
    simulation circuitry to construct a virtual network system simulating a configuration of a network system that includes the first PLC system and the second PLC system, and to simulate an operation of the network system using the virtual network system, the first PLC program, and the second PLC program, wherein
    the virtual network system includes a first virtual PLC system to simulate an operation of the first PLC system and a second virtual PLC system to simulate an operation of the second PLC system, and
    the simulation circuitry causes first time synchronization to be performed with a first period in the first virtual PLC system and causes second time synchronization to be performed with the first period in the second virtual PLC system, and causes the first virtual PLC system to execute the first PLC program and causes the second virtual PLC system to execute the second PLC program while synchronizing a first time set by the first time synchronization and a second time set by the second time synchronization with a second period.

2. The simulation device according to claim 1, wherein the first PLC system comprises:
    a first PLC to control a first control target apparatus; and
    first communication circuitry to perform data communication with the second PLC system,
    the second PLC system comprises:
    a second PLC to control a second control target apparatus; and
    second communication circuitry to perform data communication with the first PLC system,
    the first virtual PLC system comprises:
    a first virtual PLC to simulate an operation of the first PLC; and
    first virtual communication circuitry to simulate an operation of the first communication circuitry,
    the second virtual PLC system comprises:
    a second virtual PLC to simulate an operation of the second PLC; and
    second virtual communication circuitry to simulate an operation of the second communication circuitry, and
    the simulation circuitry causes the first time synchronization to be performed between the first virtual PLC and the first virtual communication circuitry in the first virtual PLC system, and causes the second time synchronization to be performed between the second virtual PLC and the second virtual communication circuitry in the second virtual PLC system.

3. The simulation device according to claim 2, wherein the simulation circuitry synchronizes the first time and the second time between the first virtual communication circuitry and the second virtual communication circuitry.

4. The simulation device according to claim 3, wherein the memory further stores configuration information indicating a configuration of the network system, and the simulation circuitry constructs the virtual network system on a basis of the configuration information.

5. The simulation device according to claim 4, wherein the simulation circuitry advances the first time according to an execution status of the first PLC program, and advances the second time according to an execution status of the second PLC program.

6. The simulation device according to claim 3, wherein the simulation circuitry advances the first time according to an execution status of the first PLC program, and advances the second time according to an execution status of the second PLC program.

7. The simulation device according to claim 2, wherein
the first virtual communication circuitry includes a virtual memory to store data generated in the first virtual PLC, and
the simulation circuitry causes the second virtual PLC system to read data in the first virtual PLC system on a basis of
first identification information for identifying the first virtual communication circuitry in a network to which the first virtual communication circuitry and the second virtual communication circuitry are connected,
second identification information for identifying the first virtual PLC system, and
third identification information for identifying the first virtual communication circuitry in the first virtual PLC system, and
an address indicating a data storage area in the virtual memory.

8. The simulation device according to claim 7, wherein
the memory further stores configuration information indicating a configuration of the network system, and
the simulation circuitry constructs the virtual network system on a basis of the configuration information.

9. The simulation device according to claim 8, wherein the simulation circuitry advances the first time according to an execution status of the first PLC program, and advances the second time according to an execution status of the second PLC program.

10. The simulation device according to claim 7, wherein the simulation circuitry advances the first time according to an execution status of the first PLC program, and advances the second time according to an execution status of the second PLC program.

11. The simulation device according to claim 2, wherein
the memory further stores configuration information indicating a configuration of the network system, and
the simulation circuitry constructs the virtual network system on a basis of the configuration information.

12. The simulation device according to claim 11, wherein the simulation circuitry advances the first time according to an execution status of the first PLC program, and advances the second time according to an execution status of the second PLC program.

13. The simulation device according to claim 2, wherein the simulation circuitry advances the first time according to an execution status of the first PLC program, and advances the second time according to an execution status of the second PLC program.

14. The simulation device according to claim 1, wherein
the memory further stores configuration information indicating a configuration of the network system, and
the simulation circuitry constructs the virtual network system on a basis of the configuration information.

15. The simulation device according to claim 14, wherein the simulation circuitry advances the first time according to an execution status of the first PLC program, and advances the second time according to an execution status of the second PLC program.

16. The simulation device according to claim 1, wherein the simulation circuitry advances the first time according to an execution status of the first PLC program, and advances the second time according to an execution status of the second PLC program.

17. A simulation method comprising:
constructing a virtual network system simulating a configuration of a network system that includes a first PLC system and a second PLC system; and
simulating an operation of the network system using a first PLC program for operating the first PLC system, a second PLC program for operating the second PLC system, and the virtual network system, wherein
the virtual network system includes a first virtual PLC system to simulate an operation of the first PLC system and a second virtual PLC system to simulate an operation of the second PLC system, and
the simulating comprises causing first time synchronization to be performed with a first period in the first virtual PLC system and causing second time synchronization to be performed with the first period in the second virtual PLC system, and causing the first virtual PLC system to execute the first PLC program and causing the second virtual PLC system to execute the second PLC program while synchronizing a first time set by the first time synchronization and a second time set by the second time synchronization with a second period.

* * * * *